Patented Sept. 18, 1951

2,568,500

UNITED STATES PATENT OFFICE 2,568,500

FLUOROCARBON ALDEHYDES AND THEIR MONOHYDRATES

Donald R. Husted, St. Paul, and Arthur H. Ahlbrecht, White Bear Township, Ramsey County, Minn., assignors to Minnesota Mining & Manufacturing Company, St. Paul, Minn., a corporation of Delaware No Drawing. Application October 6, 1949,
Serial No. 120,008

7 Claims. (Cl. 260—601)

This invention relates to our discovery of a new and useful class of reactive fluorocarbon compounds having novel properties and useful as chemical intermediates, and to a method of making them.

These new compounds are the fully fluorinated alkyl aldehydes, and their monohydrates (aldehydrols), having a saturated open-chain fluorocarbon radical joined to the carbonyl function.

The formula for the aldehydes is $R_fCHO$, and the structural formula is:

The formula for the aldehyde monohydrates (aldehydrols) is $R_fCH(OH)_2$, and the structural formula is:

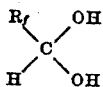

In these formulas the symbol "$R_f$" represents a non-cyclic (open-chain) saturated fluorocarbon radical (normal or branched) consisting solely of carbon and fluorine, having the formula: $C_nF_{2n+1}$. Thus the generic formula of our fluorocarbon aldehydes can be written as: $C_nF_{2n+1}CHO$, and the formula of the corresponding aldehydrols can be written as:

$$C_nF_{2n+1}CH(OH)_2.$$

The fluorocarbon aldehydes give a positive Schiff test. They are sensitive to alkalies. They are very sensitive to moisture, forming the corresponding aldehydrols almost instantaneously in the presence of water. They polymerize rapidly at room temperature; more slowly at −30° C. The polymers are claimed in our copending application, S. N. 238,018, filed July 21, 1951.

The aldehydrols are quite stable and can be converted to the aldehydes by dehydration, using a drying agent such as concentrated sulfuric acid or phosphorous pentoxide, etc. For many aldehyde reactions it is not necessary to convert the aldehydrol to the aldehyde. Thus reactions in the presence of water can be performed as well by using the aldehydrol as the starting compound, since the aldehyde would in any event be immediately converted to the aldehydrol upon contact with water.

For these reasons it is most expedient to manufacture and sell the aldehydrols, rather than the aldehydes, as the commercial products. The aldehydrols can be made directly without first making the aldehydes. They can be conveniently supplied in the form of stable high-boiling liquids or solids, as the case may be.

These new compounds are highly reactive despite the presence in the molecule of a saturated fluorocarbon radical. The saturated fluorocarbons are highly inert and stable. However, the association of the fluorocarbon radical with the carbonyl function results in compounds which are highly reactive. These compounds possess novel properties as the result of the carbonyl carbon atom being bonded to a hydrogen-free fluorinated carbon atom. These fluorocarbon compounds have a wide applicability as intermediates for the synthesis of other carbon compounds, providing a means of introducing fluorocarbon radicals into compounds of various structures. They can be used in making syntheic resins and polymers, dyes, medicinals, insecticides.

A feature of our invention is that we have provided fluorocarbon aldehydes and aldehydrols containing a plurality of carbon atoms in the fluorocarbon radical, as well as the first member of the series which has only a single fluorinated carbon atom. Compounds containing a polycarbon fluorocarbon chain attached to the carbonyl function are valuable for making a variety of derivative compounds wherein the presence of a polycarbon fluorocarbon chain is desirable, and which have properties not obtainable with a single fluorinated carbon atom.

A striking illustration of the effect of fluorocarbon chain length is provided by a simple demonstration experiment. To a flask containing toluene add 1% of n-heptafluorobutyric acid, $CF_3(CF_2)_2COOH$, and shake. The toluene no longer wets the glass surface as it did initially, the angle of contact being changed from zero to almost 90°. This is because the n-heptafluorobutyric acid molecules are adsorbed by the glass and form an interfacial film which the toluene does not wet. Trifluoroacetic acid, $CF_3COOH$, does not have this property and in fact tends to destroy the anti-wetting characteristic of the n-heptafluorobutyric acid when present with it. This demonstrates that a single fully fluorinated carbon atom, bonded to a functional group, differs in important respects from a fuly fluorinated polycarbon chain bonded to the same functional group.

The solubility in water of the fluorocarbon aldehydrols decreases with increase in length of the fluorocarbon chain. The first two members of the series are soluble, the third member is sparingly soluble, and the higher members are relatively insoluble in water. The first two members of the series are liquids at room temperature; the higher members are solids. Aldehydrols containing ten or more carbon atoms become increasingly wax-like and water-repellent with increase in fluorocarbon chain length.

Our invention embraces compounds containing from two to eighteen carbon atoms in the molecule.

Trifluoroacetaldehyde, $CF_3CHO$, has a boiling point of about minus 15° C. at 740 mm. This compound can also be designated by the name "fluoral" (by analogy to chloral and bromal). The aldehydrol form, $CF_3CH(OH)_2$, which can be termed "fluoral hydrate," has a boiling point of about 105° C.

Pentafluoropropionaldehyde, $C_2F_5CHO$, has a boiling point of about 2° C. at 740 mm. The aldehydrol form, $C_2F_5CH(OH)_2$, boils somewhat above 93° C.

n-Heptafluorobutyraldehyde, $C_3F_7CHO$, has a boiling point of about 28° C. at 740 mm., a density of 1.505 at 20° C., and a refractive index of 1.273 at 4° C. The aldehydrol form, $$C_3F_7CH(OH)_2$$

has a boiling point of about 93° C., and a melting point of about 61° C.

n-Nonafluorovaleraldehyde, $C_4F_9CHO$, has a boiling point of about 48° C. at 740 mm. The aldehydrol form, $C_5F_9CH(OH)_2$, has a boiling point of about 100° C. at 740 mm.

The recovery of the pure aldehydes is difficult in the case of the higher members of the series which have ten or more carbon atoms in the molecule (nine or more carbon atoms in the fluorocarbon radical). The aldehydrol compound $C_9F_{19}CH(OH)_2$ is a solid material having a melting point of about 114° C. and a boiling point of about 148° C. at 740 mm. Data on the corresponding aldehyde is not given as we are not certain that it was recovered in reasonably pure form, although identification was made by a positive Schiff test. As previously mentioned, the aldehydrol form can be used in the preparation of aldehyde derivatives and it is not essential, from a practical standpoint, that the aldehyde be prepared as such.

Examples of derivatives of our new compounds are the diacetates of the aldehydrols, which have the generic formula: $R_fCH(OAc)_2$. The first member of this series is $CF_3CH(OAc)_2$, a liquid having a boiling point of about 149° C. at 740 mm., a density of 1.291 at 20° C., and a refractive index of 1.354 at 20° C. The compound $C_3F_7CH(OAc)_2$ has a boiling point of about 164° C. at 740 mm., a density of 1.431 at 20° C., and a refractive index of 1.338 at 20° C. These compounds are claimed in our copending application S. N. 186,690, filed September 25, 1950.

Further examples of derivatives are the semicarbazones of the aldehydes. The compound $C_3F_7C:NNHCONH_2$ has a melting point of about 52° C.

Further examples are the mono-substituted 2,4-dinitrophenylhydrazone derivatives of the aldehydes. The compound $$CF_3CH:NNHC_6H_3(NO_2)_2$$

has a melting point of about 136° C. The compound $C_2F_5CH:NNHC_6H_3(NO_2)_2$ has a melting point of about 126° C. The compound $$C_9F_{19}CH:NNHC_6H_3(NO_2)_2$$

has a melting point of about 128° C.

A di-substituted 2,4-dinitrophenylhydrazine derivative of an aldehydrol is illustrated by the compound $C_3F_7CH(NHNHC_6H_3(NO_2)_2)_2$, which has a melting point of about 99° C.

Further examples are the alcohols that can be formed by the Grignard reaction. Thus by subjecting heptafluorobutyraldehyde to the action of methyl magnesium iodide, the compound 1-heptafluoropropylethanol, $C_3F_7CH(CH_3)OH$, can be obtained.

Method of making

We have discovered that the above-mentioned fluorocarbon aldehydrols, having the formula $C_nF_{2n+1}CH(OH)_2$, can be made by reduction of the corresponding fluorocarbon carboxylic acids, having the formula $C_nF_{2n+1}COOH$, using lithium aluminum hydride, $LiAlH_4$. The recovered aldehydrol compound is the precursor of the aldehyde compound and can be converted thereto by dehydration, using a drying agent such as sulfuric acid, phosphorous pentoxide, acetic anhydride, etc.

The following example illustrates the method as applied to the making of heptafluorobutyraldehydrol, $C_3F_7CH(OH)_2$ and heptafluorobutyraldehyde, $C_3F_7CHO$, by reduction of heptafluorobutyric acid, $C_3F_7COOH$, viz.:

The reaction apparatus is a dry 3000 ml. 3-necked glass flask equipped with a stirrer, a water-cooled reflux condenser, a dropping funnel, and a gas inlet tube so that dry nitrogen can be flowed through the system. The apparatus should be dried at 120° C. before use, and assembled while still hot with dry oxygen-free nitrogen passing through the apparatus.

Precautions must be observed in using the $LiAlH_4$ reduction agent. It is sensitive to $H_2O$ and $CO_2$ in the air, is spontaneously inflammable with water, and inflames on rubbing unprotected in a mortar. The material is crushed in a mortar under a dry nitrogen atmosphere and added rapidly to the ether in the flask with a slow nitrogen stream flowing through the system. In case of a fire, do not use a water or carbon dioxide fire extinguisher. Use nitrogen or a dry-powder type of extinguisher.

With nitrogen flowing through the system, the flask is charged with 1250 ml. of dry diethyl ether and then with 19 grams (0.5 mol) of powdered $LiAlH_4$. The suspension is stirred until the $LiAlH_4$ dissolves, leaving only a slight haze of insoluble impurities in suspension. To this solution is added dropwise 107 grams (0.5 mol) of $C_3F_7COOH$ in 1000 ml. of dry diethyl ether while the flask is kept cool in an ice bath. The addition is made at a rate which will produce a gentle reflux of the ether.

Upon completion of the addition the nitrogen is turned off and the reaction mixture is stirred for 48 hours. Then the nitrogen is turned on, the flask is cooled with an ice-salt mixture, and sufficient water is added dropwise to decompose the excess $LiAlH_4$. Hydrogen is evolved as long as the latter is present. The endpoint is not sharp, but about 10 ml. water should be sufficient, and 2 to 5 ml. excess water should be added to be sure all unreacted $LiAlH_4$ is destroyed. A modified procedure is to make the first small addition of water by means of diethyl ether saturated with water, and use a 2 cubic ft. per hour sweep stream of nitrogen saturated with water vapor. To avoid explosions, great care should be exercised to maintain a nitrogen atmosphere in the reaction flask.

After the addition of water is completed, add immediately an ice-cold solution of 80 ml. (1.5 mols) of concentrated sulfuric acid in 200 ml. of water, with continued cooling. Separate the two layers and extract the bottom water layer three times with diethyl ether. The upper ether layer and the ether extracts from the bottom layer are combined and the ether removed in a stripping still. A still with 4 to 6 theoretical plates is sufficient.

The residue is dried over anhydrous calcium sulfate ("Drierite") and distilled through an efficient semi-micro fractionating column, which should have 6 to 15 theoretical plates. The cut boiling from 85 to 95° C., which should weigh 85–95 grams, contains the fluorocarbon aldehydrol product.

The aldehyde can be prepared by charging the above-mentioned 85–95° cut into a 2-neck 200 ml. flask equipped with a dropping funnel and a dry semi-micro fractionating column. Care should be taken that all joints are tight. 35 ml. of concentrated sulfuric acid is added slowly through the dropping funnel and the resulting mixture is refluxed gently to cause decomposition of the aldehydrol compound, which is the precursor of the aldehyde. The mixture is gently refluxed as too much heat may cause a sudden evolution of aldehyde. The aldehyde product distils out at a temperature of 28–30° C. It is collected in a receiver cooled by solid-$CO_2$, whose outlet is protected by a trap cooled by solid-$CO_2$ and a drying tube. The yield is about 40%.

The fluorocarbon aldehyde product is kept dry and cold (below 0° C.) for storage.

The products made by this exemplary procedure, namely, $C_3F_7CH(OH)_2$ and $C_3F_7CHO$, have been previously characterized by their physical and chemical properties, together with those of other members of the series. The $C_3F_7CHO$ product had a determined molecular weight of 196 (calculated from vapor density) in substantial agreement with the formula weight of 198. The infra-red spectrum contained the C=O band and also showed the presence of C—F and C—H bonds. The corresponding aldehydrol, $$C_3F_7CH(OH)_2$$

was analyzed for fluorine and a value of 60.5% F was obtained. The value calculated from the formula is 6.6% F.

*Preparation of fluorocarbon acids*

The fluorocarbon monocarboxylic acids utilized as starting compounds in the foregoing method of making our novel compounds, have the generic formula $C_nF_{2n+1}COOH$.

These fully fluorinated acids are extremely strong, the acid strength of aqueous solutions being of the same order of magnitude as that of strong mineral acids, whereas the corresponding hydrocarbon acids are relatively weak. They can be made by hydrolyzing the corresponding acid fluorides ($R_fCOF$), which are highly reactive and readily react with water to form the carboxylic acid derivatives. The acid fluorides can be made by electrolyzing a solution of anhydrous liquid hydrogen fluoride containing a dissolved hydrocarbon monocarboxylic acid (or its anhydride) of corresponding carbon skeletal structure, by passing direct current through the solution at a cell voltage which is insufficient to generate molecular (free elemental) fluoride under the existing conditions, but which is sufficient to cause the formation of the fully fluorinated acid fluoride ($R_fCOF$) at a useful rate.

Excellent results can be obtained with simple single compartment electrolytic cell arrangements. No diaphragm is needed between electrodes. The cell can be readily operated at atmospheric pressure, employing a cell temperature in the neighborhood of 0° C. The cell and the cathodes can be made of iron or steel, and the anodes of nickel, and such cells have been satisfactorily operated at approximately 5 to 6 volts, D. C. The fluorocarbon acid fluoride product of the cell operation is relatively insoluble in the electrolyte solution and either settles to the bottom of the cell from which it can be drained with other fluorocarbon products of the process, or is volatilized and evolves from the cell in admixture with the hydrogen and other gaseous products. The fluorocarbon acid fluoride compound can be hydrolyzed to the fluorocarbon acid derivative ($R_fCOOH$) while still mixed with other products and the acid product can be separated and recovered. Another procedure is to react the acid fluoride with ammonia to produce the amide ($R_fCONH_2$), a solid compound which can be readily separated and purified, and then hydrolyze the latter to produce the fluorocarbon acid ($R_fCOOH$).

The electrochemical process is described and claimed in the copending application of J. H. Simons, S. N. 62,496, filed November 29, 1948, since issued as Patent No. 2,519,983 on August 22, 1950. Fluorocarbon acids are described and claimed in the copending application of A. H. Diesslin, E. A. Kauck and J. H. Simons, S. N. 70,154, filed January 10, 1949, which also describes the electrochemical process.

What we claim is as follows:

1. As new compositions of matter, the noncyclic reactive fluorocarbon compounds of the class consisting of the fluorocarbon aldehydes having the formula $C_nF_{2n+1}CHO$ and the corresponding fluorocarbon aldehydrols having the formula $C_nF_{2n+1}CH(OH)_2$, said compounds having from 2 to 18 carbon atoms in the molecule.

2. The compound trifluoroacetaldehydrol having the formula $CF_3CH(OH)_2$.

3. The compound pentafluoropropionaldehydrol having the formula $C_2F_5CH(OH)_2$.

4. The compound heptafluorobutyraldehydrol having the formula $C_3F_7CH(OH)_2$.

5. The compound trifluoroacetaldehyde having the formula $CF_3CHO$.

6. The compound heptafluorobutyraldehyde having the formula $C_3F_7CHO$.

7. As new compositions of matter, the noncyclic reactive fluorocarbon compounds of the class consisting of the fluorocarbon aldehydes having the formula $C_nF_{2n+1}CHO$ and the corresponding fluorocarbon aldehydrols having the formula $C_nF_{2n+1}CH(OH)_2$, said compounds having from 3 to 18 carbon atoms in the molecule.

DONALD R. HUSTED.
ARTHUR H. AHLBRECHT.

REFERENCES CITED

The following references are of record in the file of this patent:

FOREIGN PATENTS

| Number | Country | Date |
| --- | --- | --- |
| 577,481 | Great Britain | May 20, 1946 |

OTHER REFERENCES

Hackh: Chemical Dictionary, 3rd edition, 1944, pages 143, 191 and 444. The Blakiston Company.

Henne et al.: Jour. Am. Chem. Soc., vol. 70, pages 1968, May 1948.

Groog et al.: 71 JACS, 1710–11 (May 1949).